United States Patent
Runesson et al.

[11] Patent Number: 6,086,059
[45] Date of Patent: Jul. 11, 2000

[54] GAS SPRING DEVICE

[75] Inventors: Johan Runesson; Arne Jacobsson, both of Linkoping, Sweden

[73] Assignee: Strolsholmen AB, Tranas, Sweden

[21] Appl. No.: 09/023,839

[22] Filed: Feb. 13, 1998

[51] Int. Cl.[7] .................................. F16F 9/02; F16F 7/12
[52] U.S. Cl. ................ 267/64.11; 188/300; 188/322.17; 188/376; 267/64.12; 267/120; 267/124
[58] Field of Search ............... 267/64.11–64.28, 267/120–129, 116, 113; 277/928, 917; 188/371–377, 322.17, 300, 276, 278, 277; 293/133, 134; 137/797; 285/2, 3; 403/2; 16/66, 84; 92/165 R, 168

[56] References Cited

U.S. PATENT DOCUMENTS

| | | | |
|---|---|---|---|
| 3,968,862 | 7/1976 | Gorges et al. | 188/376 |
| 3,995,842 | 12/1976 | Freitag | 188/376 |
| 4,003,456 | 1/1977 | Wössner . | |
| 4,108,423 | 8/1978 | Skubal | 188/276 |
| 4,185,542 | 1/1980 | York et al. . | |
| 4,257,581 | 3/1981 | Keeler, II | 293/134 |
| 4,426,109 | 1/1984 | Fike, Jr. | 267/116 |
| 4,641,872 | 2/1987 | Löhr et al. | 293/134 |
| 4,718,647 | 1/1988 | Ludwig | 267/120 |
| 4,736,824 | 4/1988 | Dony et al. | 267/120 |
| 4,779,845 | 10/1988 | Bartesch et al. | 267/120 |
| 4,789,192 | 12/1988 | Warner et al. | 188/376 |
| 4,852,862 | 8/1989 | Bauer et al. | 267/120 |
| 4,915,363 | 4/1990 | Prozeller et al. . | |
| 4,988,081 | 1/1991 | Dohrmann | 188/371 |
| 5,014,603 | 5/1991 | Navarette et al. . | |
| 5,197,718 | 3/1993 | Wallis | 267/124 |
| 5,303,906 | 4/1994 | Cotter et al. | 188/371 |
| 5,443,146 | 8/1995 | Ayyildiz et al. | 188/374 |
| 5,454,455 | 10/1995 | Kundmüller et al. . | |
| 5,485,987 | 1/1996 | Jobelius et al. . | |
| 5,735,371 | 4/1998 | Jobelius et al. | 188/276 |
| 5,862,893 | 1/1999 | Völpel | 188/276 |
| 5,884,959 | 3/1999 | Hillen | 188/276 |

FOREIGN PATENT DOCUMENTS

| | | |
|---|---|---|
| 24 57 938 | 6/1976 | Germany . |
| 42 16 573 | 11/1993 | Germany . |

*Primary Examiner*—Douglas C. Butler
*Attorney, Agent, or Firm*—Merchant & Gould P.C.

[57] ABSTRACT

A gas spring device is provided with a safe and effective way to reduce to zero the velocity of a piston rod which is traveling at a high velocity in the gas spring device during a failure of the gas spring device. This achieved by stopping the piston rod in a controlled manner through a stepwise reduction in its energy and velocity to keep the force on the piston to a minimum at all times during the failure. The reduction in energy is caused by a plurality of frangible components associated with the gas spring device which are designed to break during a failure, thereby dissipating the kinetic energy of the piston rod.

8 Claims, 5 Drawing Sheets

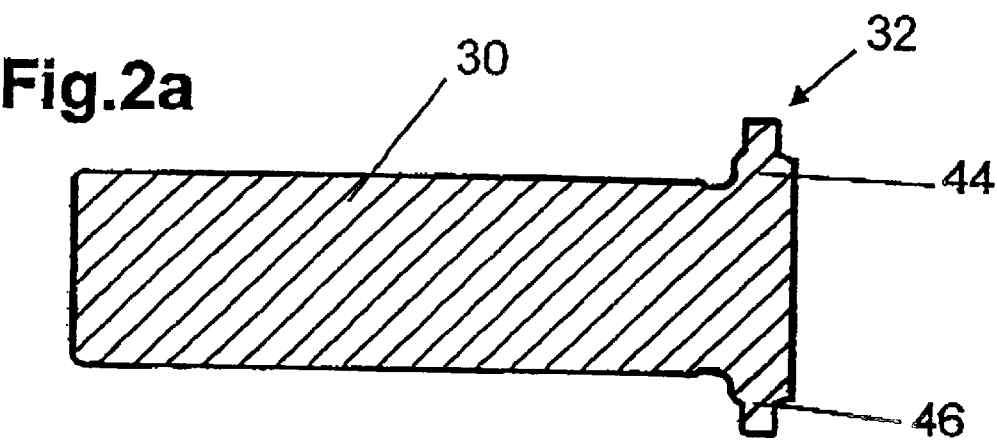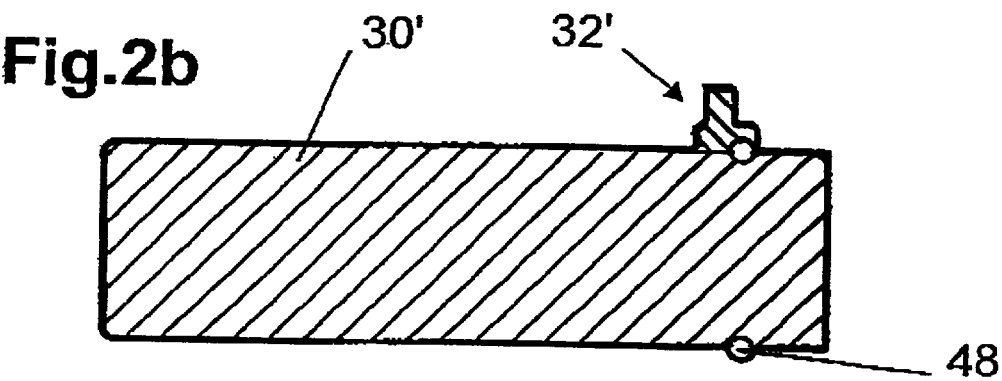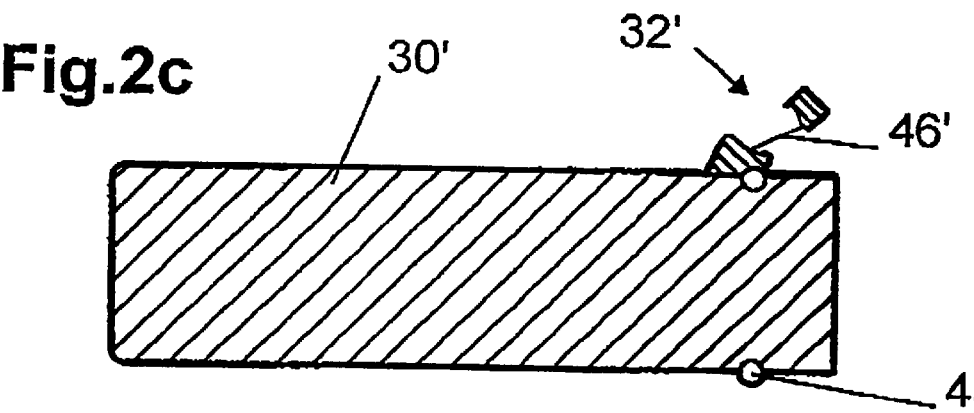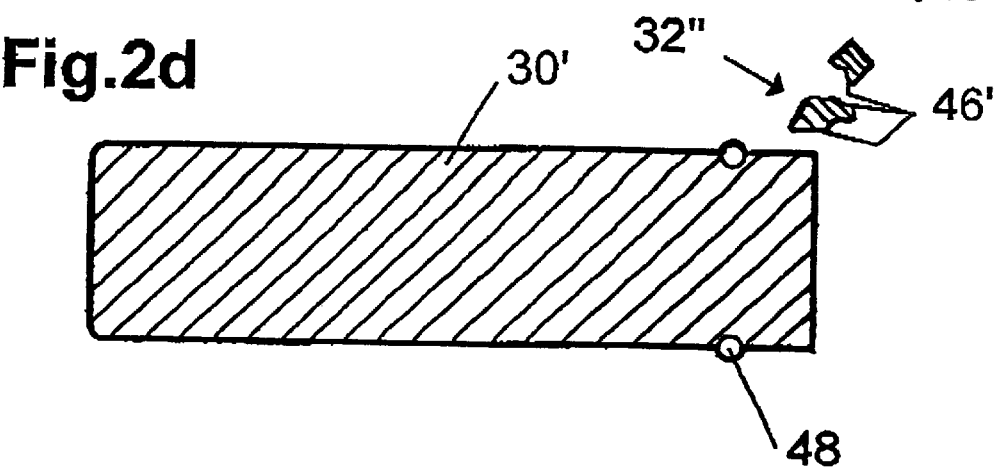

6,086,059

GAS SPRING DEVICE

FIELD OF THE INVENTION

This invention relates to gas spring devices, and more particularly this invention relates to a gas spring device having improved safety.

BACKGROUND OF THE INVENTION

A gas spring is normally pre-loaded with gas under high pressure, typically 60–160 bar. If the piston of the gas spring is accidentally broken away from the piston rod during use, the piston rod is free to accelerate in a piston rod guide on its way out of the gas spring.

U.S. Pat. No. 5,485,987 shows a gas spring where the piston rod seal is axially displaceable in order to open a normally closed radial bore through the cylinder, in order to permit escape of pressurized gas in case of the pressurized gas exceeding a predetermined pressure.

U.S. Pat. No. 5,454,455 shows a cylinder piston device where the piston, as it approaches the end of the cylinder, is arranged to abut against an indentation of the cylinder so as to be tilted or angled by the abutment in order to achieve a clamping effect which prevents expulsion of the piston rod and initiates a leak allowing pressurized fluid to escape.

A further gas spring is shown in DE-A1-24 57 938 in which pressurized fluid can be evacuated through controlled breakage of the cylinder and/or the piston rod at specially designed breaking points. In this type of arrangement, parts of the cylinder piston device are able to separate and become a high velocity projectile. DE-A1-42 16 573 shows a gas spring in which a guide is arranged to deform a piston rod seal in order to evacuate the pressurized gas from the gas spring if the pressure becomes too high.

SUMMARY OF THE INVENTION

The purpose of the present invention is to provide a safe and effective way to reduce to zero the velocity of a piston rod which is traveling at a high velocity in a gas spring device during a failure of the gas spring device. This achieved by stopping the piston rod in a controlled manner through a stepwise reduction in its energy and velocity to keep the force on the piston to a minimum at all times during a gas spring device failure.

In one embodiment in accordance with the present invention, a piston cylinder device is provided having a tubular wall, an end wall at a first end of the tubular wall, and a guide at a second end of the tubular wall. The tubular wall, the end wall, and the guide define a pressure chamber therebetween, and a piston rod slideably extends through the guide and into the pressure chamber. Frangible means are provided for preventing ejection of the piston rod from the guide. During a failure of the piston cylinder device when the piston rod is moving at high velocity, the frangible means provide a controlled stoppage of the piston rod through a stepwise dissipation of its kinetic energy.

In accordance with another embodiment of the present invention, a gas spring device is provided including a cylinder having a tubular wall, an end wall at a first end of the tubular wall, and a guide at a second end of the tubular wall. The tubular wall, the end wall, and the guide form a pressure chamber therebetween. A piston rod and piston assembly is associated with the cylinder, with the assembly including a piston rod extending through the guide and into the pressure chamber, with the piston rod being slideable relative to the guide, and a piston is connected to the piston rod within the pressure chamber. A breaking zone formed on one of the assembly and the guide to dissipate the kinetic energy of the piston rod during a failure of the gas spring device.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

FIGS. 2a, 2b, 2c and 2d illustrate different embodiments of piston and piston rod assemblies for use in the present invention.

DETAILED DESCRIPTION OF THE PREFERRED EMBODIMENT

Figure 1:
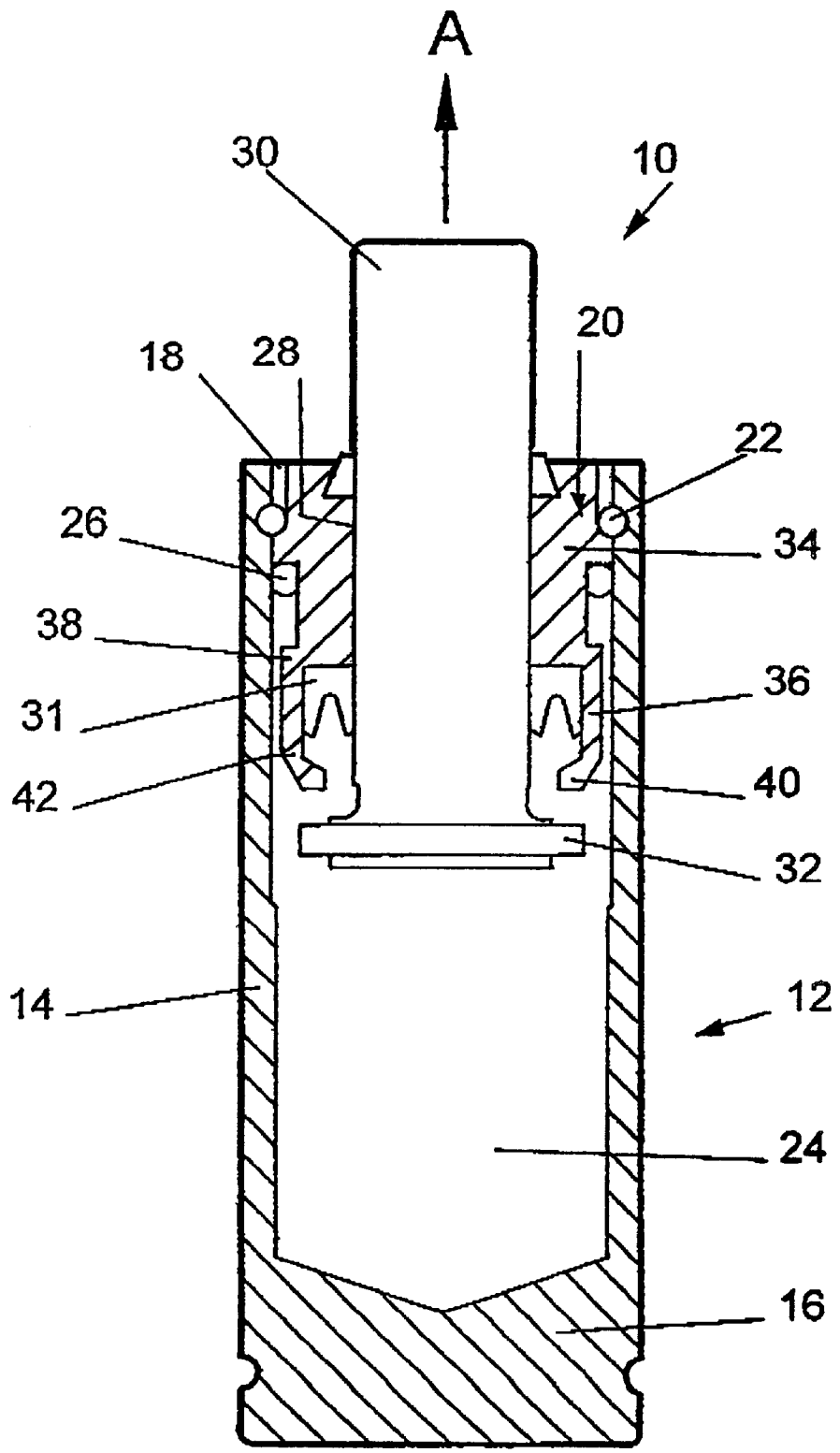
FIG. 1 is a longitudinal cross-sectional view of the gas piston device in accordance with the present invention.

With reference now to FIG. 1, a gas spring device 10 in accordance with the principles of the present invention is illustrated therein. The gas spring device 10 includes a cylinder 12 having a tubular wall 14 with an end wall 16 closing off one end of the tubular wall. The opposite end of the tubular wall 14 includes an opening 18, and a piston rod guide 20 is fixedly secured within the opening 18 by a locking ring 22 so as to form a pressure chamber 24 in the cylinder 12. A seal 26 is disposed between the piston rod guide 20 and the interior surface of the tubular wall 14, in order to prevent fluid leakage between the exterior of the guide 20 and the interior surface of the tubular wall 14. The pressure chamber 24 is normally pre-loaded with gas under high pressure, typically on the order to 60–160 bar.

The guide 20 includes a central opening 28 therethrough, and a piston rod 30 is slidingly received in the opening 28 and extends into the pressure chamber 24. A piston 32 is secured to the end of the piston rod 30 in the pressure chamber 24. A seal 31 surrounds the piston rod 30 and is disposed against the end of the guide 20 in order to prevent fluid leakage between the piston rod and the guide.

As mentioned previously, the gas spring device 10 of the present invention is designed to stop the piston rod in a controlled manner upon a failure in the gas spring device which causes the piston rod 30 to move with high velocity in the direction of the arrow A shown in FIG. 1. This is accomplished by designing the gas spring device 10 with a plurality of frangible components which are designed to break during a failure which results in uncontrolled high velocity movement of the piston rod, thereby absorbing the kinetic energy of the piston rod 30 and causing it to stop.

As shown in FIG. 1, it can be seen that the piston rod guide 20 includes a main body portion 34 which defines the opening 28, and a cylindrical skirt portion 36 extending into the pressure chamber 24 from the end of the main body portion 34. The skirt portion 36 is connected to the main body portion 34 at a breaking zone 38 which is designed to allow the skirt portion to break from the main body portion when a sufficient force is applied to the skirt portion by the piston 32 during an uncontrolled high velocity movement of the piston rod 30. The skirt portion 36 is further provided with a head portion 40 which is connected to the skirt portion by a breaking zone 42, such that the head portion can break away from the rest of the skirt portion during a failure. Thus the skirt portion 36 and the head portion 40 of the skirt portion are both frangible components which are designed to break during high velocity movement of the piston rod.

The piston 32 is further designed to break away from the piston rod 30 during a failure, thereby absorbing further energy. With reference to FIG. 2a, one embodiment of a piston rod and piston assembly is illustrated in which the piston 32 is integrally formed with the piston rod 30. The piston rod 30 includes an enlarged end 44 upon which the piston 32 is integrally formed. However, a breaking zone 46 is generally defined at the juncture of the piston 32 and the enlarged end 44 such that the piston 32 is able to break away from the enlarged end 44 during a failure, to thereby absorb further kinetic energy. It is also seen that the diameter of the enlarged end 44 is greater than the diameter of the opening 28, such that the piston rod 30 is prevented from ejecting from the gas spring device 10 due to interference between the enlarged end 44 and the opening 28.

A further embodiment of a piston rod and piston assembly is illustrated in FIG. 2b, in which the piston 32' is not integrally formed with the piston rod 30', but is instead secured to the piston rod 30' by a lock ring 48 which is disposed in a circumferential groove in the piston rod and in a groove in the piston 32'. As shown in FIG. 2c, the piston 32' can be designed such that a portion thereof is broken off at a breaking zone 46', with the remainder of the piston remaining attached to the piston rod 30'. In this instance it can be seen that the remaining portion of the piston has a diameter larger than the opening 28, thus preventing ejection of the piston rod 30'. The remaining portion of the piston 32' thus acts similar to the enlarged end 44 of the piston rod 30.

Alternatively to having a portion of the piston remain connected to the piston rod, the entire piston 32' can be designed to break away from the piston rod 30', leaving only the retaining ring 48. However, the exterior diameter of the retaining ring 48 is larger than the diameter of the opening 28, thereby preventing ejection of the piston rod 30'.

Therefore the piston 32,32' of the present invention is also designed as a frangible component which is designed to break during a failure, to thereby dissipate the kinetic energy of the fast moving piston rod.

Figure 3A:
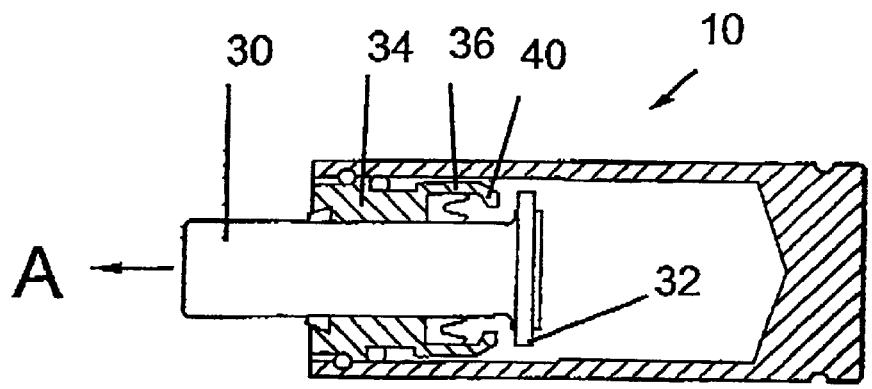
FIGS. 3a, 3b, 3c and 3d illustrate a possible failure sequence of the gas piston device.
Figure 3B:
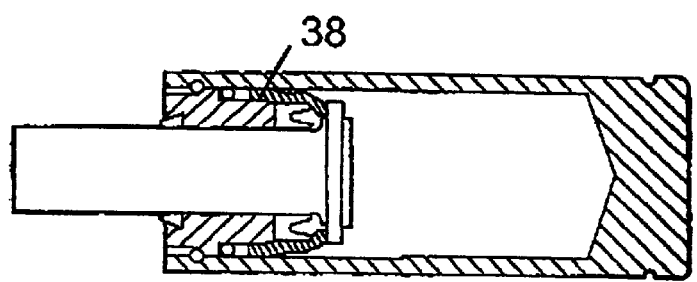
Figure 3C:
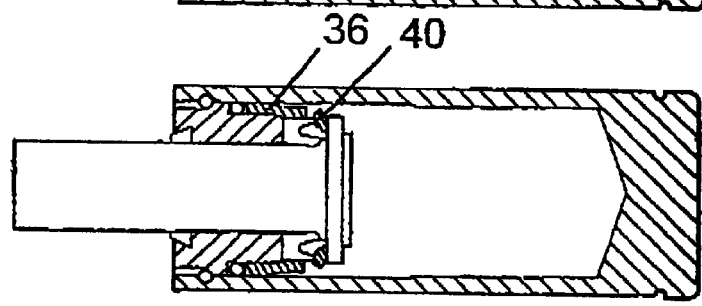
Figure 3D:
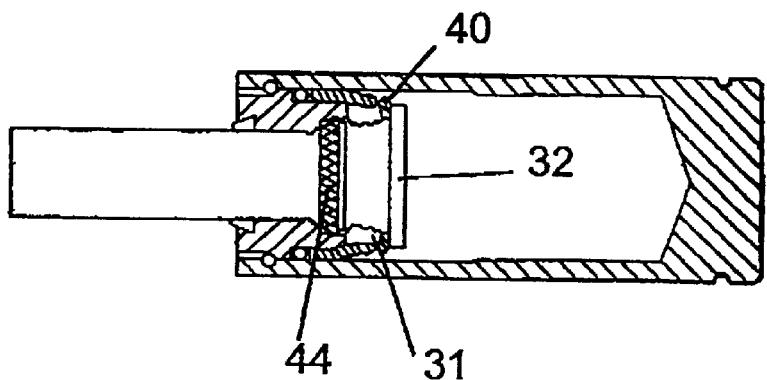

FIGS. 3a–d illustrate one possible failure sequence that can occur during a failure of the gas spring device 10, utilizing the piston rod and piston assembly of FIG. 2a. FIG. 3a illustrates the device 10 in the initial stages of failure, with the piston rod 30 just starting to move at high speed to the left in the direction of the arrow A. Upon further movement of the piston rod, the piston 32 will contact the head portion 40 of the skirt portion 36, thus causing the skirt portion to break away from the main body portion 34 at breaking zone 38 as shown in FIG. 3b. The broken away skirt portion 36 will be forced onto the main body portion and/or against the inner wall of the tubular wall 14, thereby causing the space for the seal 31 to change in form and shape and thus introducing a gas leak. A gas leak provides a visual indication of a failure within the gas spring device 10. When the broken away skirt portion 36 bottoms out against the seal 26, thereby stopping further movement of the broken skirt portion, the head portion 40 of the skirt will then break away at breaking zone 42, as shown in FIG. 3c, thereby further dissipating energy. The head portion 40 will be forced against the seal 31 by the piston rod and piston assembly, with the seal 31 acting as a damper to dissipate further energy of the now slower moving piston rod. In addition, the space for the seal 31 will deform even more, and thereby introduce even further gas leakage. Further movement of the piston rod 30 will cause the broken skirt portion, the broken head portion, and the seal 31 to be forced together, with the head portion eventually contacting the piston 32 and causing the piston to break away from the enlarged end 44 at breaking zone 46, thereby causing a further dissipation of energy. If energy remains, the piston rod will continue traveling, destroying the seal 31 and eventually the enlarged end 44 is forced into the opening 28 which dissipates the final amount of energy leaving the enlarged end 44 stuck in the main body portion 34 of the guide 20.

Figure 4A:
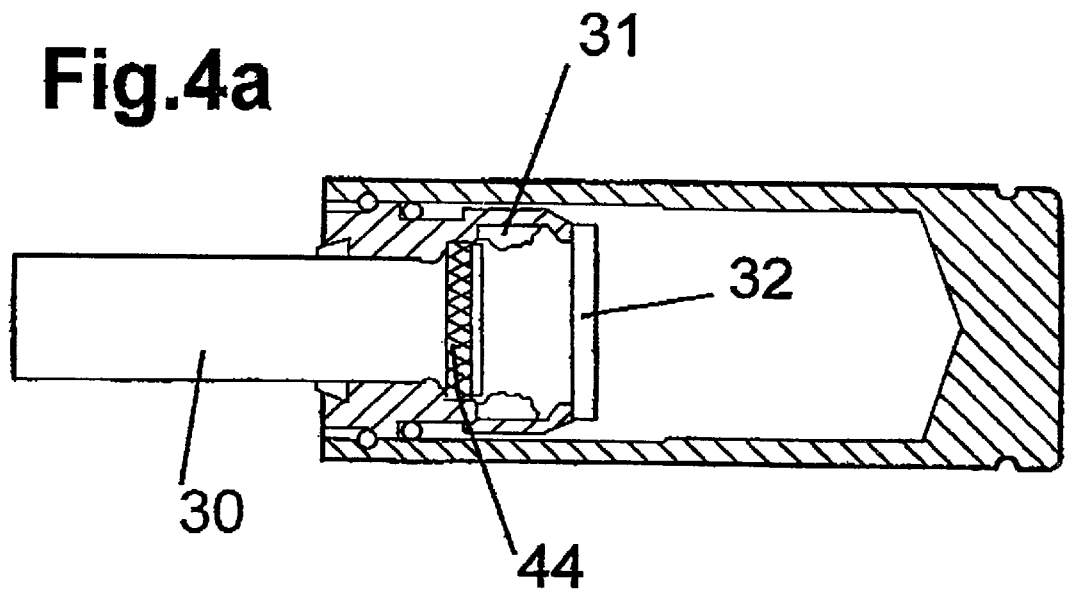
FIGS. 4a and 4b illustrate other possible failure sequences of the gas piston device.
Figure 4B:
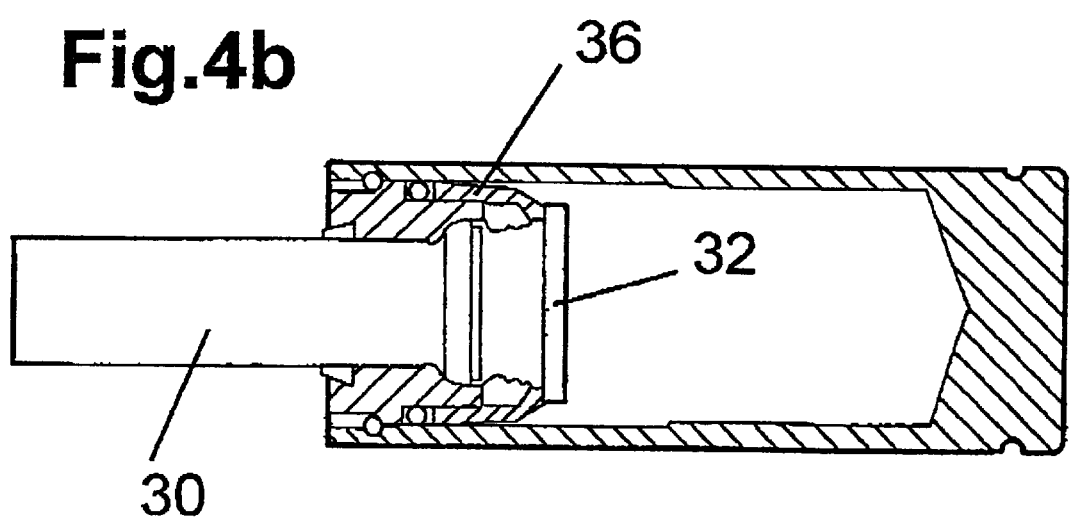

Other possible failure sequences are illustrated in FIGS. 4a and 4b, in which FIG. 4a illustrates the piston 32 being broken away from the piston rod 30, with no other components breaking away, and FIG. 4b illustrates both the skirt portion of the guide 20 and the piston being broken.

Figure 5A:
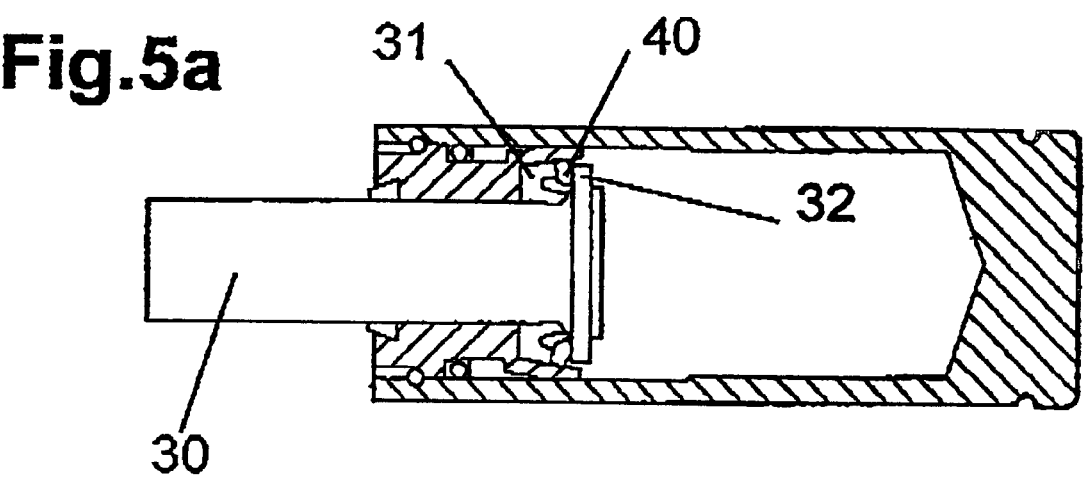
FIGS. 5a and 5b illustrate additional possible failure sequences of the gas piston device.
Figure 5B:
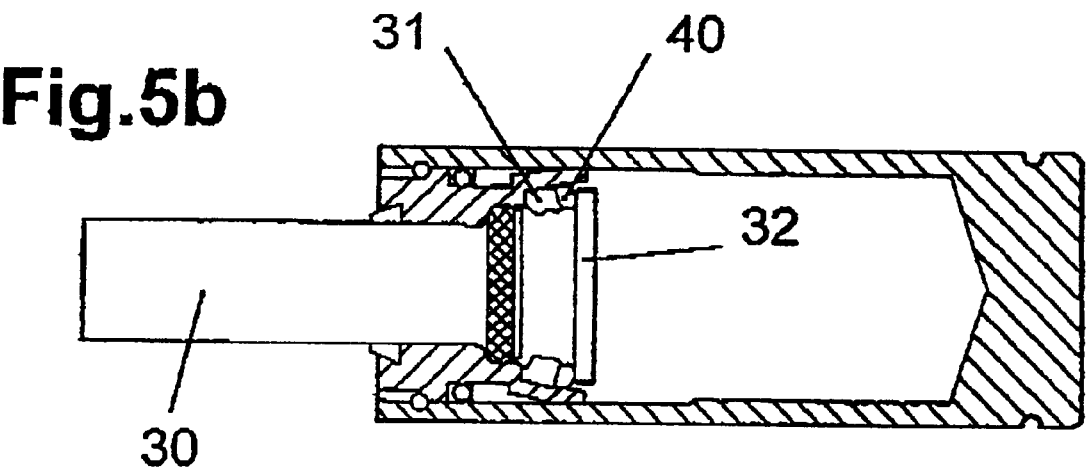

FIG. 5a illustrates a failure sequence in which the head portion 40 is broken away, thus changing the space for the seal 31 and thereby introducing a fluid leakage. FIG. 5b illustrates a sequence similar to FIG. 5a, except that both the head portion 40 and the piston 32 are broken off.

It is to be realized that other failure sequences could occur as well. Further, although the failure sequences were described in relation to the piston rod and piston assembly shown in FIG. 2a, similar failure sequences would apply to the piston rod and piston assemblies shown in FIGS. 2b–2d.

The breakage of the various frangible components of the gas spring device of the present invention, in addition to the deformation of the seal 31 and the opening 28, achieve a controlled stoppage of the piston rod during a failure of the gas spring device, by stepwise dissipating its kinetic energy. Further, the deformation of the seal 31 allows fluid to leak from the cylinder 12, thus providing a visual indication of the occurrence of a failure.

It is to be understood that while certain embodiments of the present invention have been illustrated and described, the invention is not limited to the specific forms or arrangements of parts described and shown.

We claim:

1. A piston cylinder device, comprising:
   a cylinder having a tubular wall, an end wall at a first end of the tubular wall, and a guide at a second end of the tubular wall, and said tubular wall, said end wall, and said guide forming a pressure chamber therebetween;
   a piston rod extending through the guide and into the pressure chamber, said piston rod being slideable relative to the guide; and
   frangible means for preventing ejection of the piston rod from the guide, wherein said frangible means comprises a skirt extending into the pressure chamber from the guide and a head portion connected to the skirt.

2. The piston cylinder device according to claim 1, wherein said frangible means further comprises a piston connected to the piston rod.

3. A gas spring device, comprising:
   a cylinder having a tubular wall, an end wall at a first end of the tubular wall, and a guide at a second end of the tubular wall, and said tubular wall, said end wall, and said guide forming a pressure chamber therebetween;
   a piston rod and piston assembly associated with said cylinder, said assembly including a piston rod extending through the guide and into the pressure chamber, said piston rod being slideable relative to the guide, and a piston connected to the piston rod and disposed within the pressure chamber; and wherein said guide includes a skirt extending therefrom into said pressure chamber, said skirt being connected to said guide at a first breaking zone and further including a head portion at a free end of the skirt, said head portion being connected to said skirt at a second breaking zone.

4. The gas spring device according to claim 3, further including a breaking zone formed on said assembly.

5. The gas spring device according to claim 4, wherein said piston rod includes an enlarged end, and said piston is connected to the enlarged end.

6. The gas spring device according to claim 4, wherein said piston is connected to said piston rod by a lock ring.

7. The gas spring device according to claim 3, wherein the guide includes a cylindrical opening through which said piston rod extends, said opening having a diameter, and said piston rod having an end that is disposed within said pressure chamber, said end having a diameter greater than the diameter of the opening.

8. The gas spring device according to claim 7, further including a seal between said piston rod and said guide to prevent fluid leakage through said cylindrical opening, said seal being deformable by one of said guide and said assembly to an extent which permits fluid leakage through said cylindrical opening.

* * * * *